Patented Aug. 4, 1942

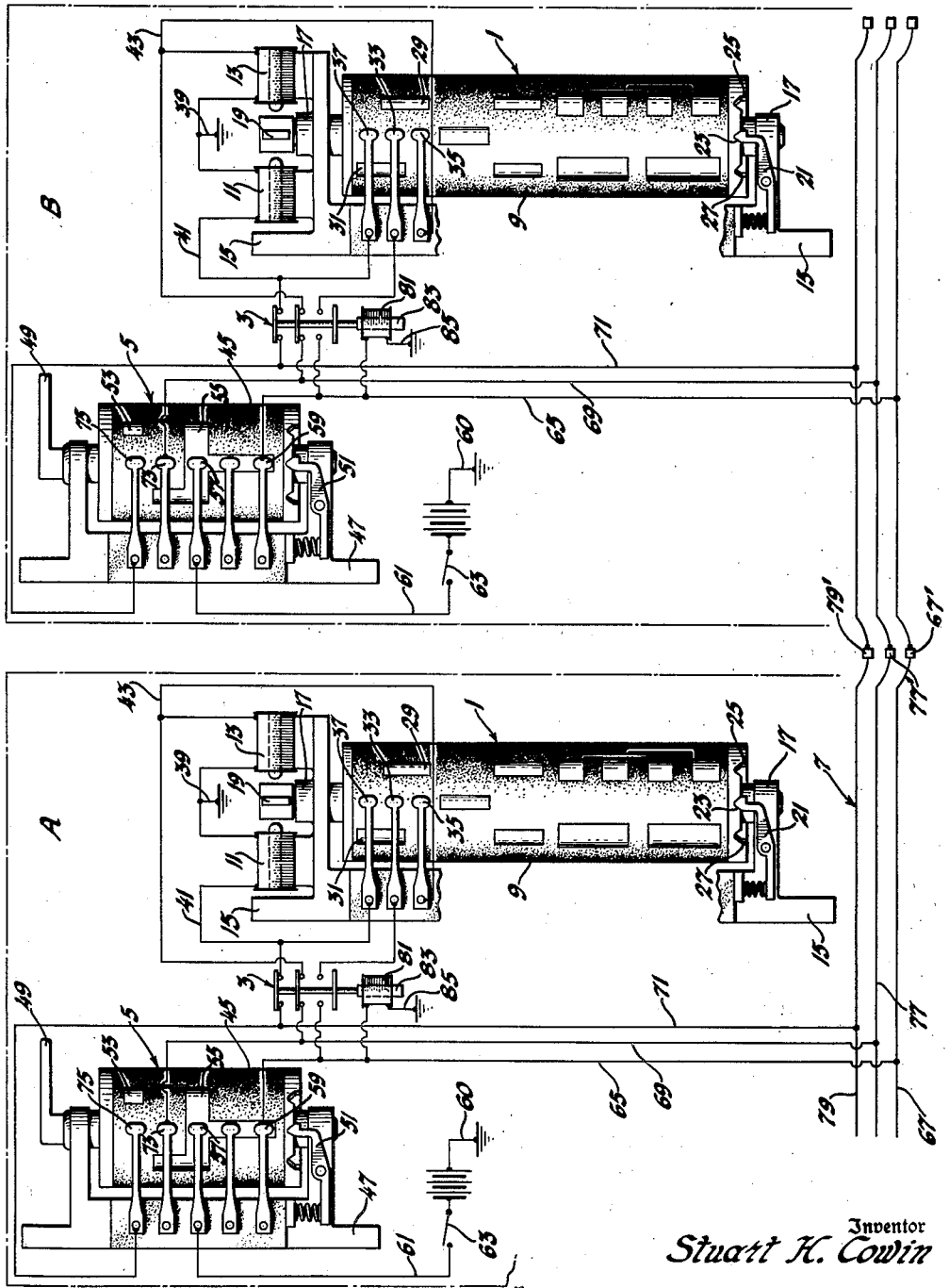

2,292,202

UNITED STATES PATENT OFFICE 2,292,202

REVERSING AND DISCONNECTING CONTROL SYSTEM

Stuart H. Cowin, Chicago, Ill., assignor to General Motors Corporation, Detroit, Mich., a corporation of Delaware Application September 6, 1940, Serial No. 355,590

11 Claims. (Cl. 175—294)

The invention relates to remotely controlled power operated control mechanisms, and more particularly to control means which insure concordance of movement of a plurality of such mechanisms to any one of a plurality of positions.

The invention is particularly adapted for the control of a plurality of power operated control mechanisms, each of which is movable in either direction from and to a neutral position, such as those employed for operating combined reversing and disconnecting switches for electrical equipment on locomotives.

Where a plurality of locomotive units are operated in multiple and each unit is provided with one or more power operated control switches supplied with power from a separate power source on each unit, variations in the power supply to the various power means and/or variations in friction between the switches operated thereby may cause overshooting of certain switches so that they may be moved to different positions when the control connections to each of said power operated switches are interconnected and controlled in multiple from a master controller. This non-concordance of movement of the various switches to different positions may result in serious damage should the electrical equipment controlled thereby, such as the traction motors of one locomotive unit, be connected for reverse rotation with respect to the motors of the other units.

The principal object of the invention is to provide simple, remotely controlled power operated means to insure concordance of movement of a plurality of such means to any one of a plurality of positions.

Another object is the provision of means whereby the energization of remotely controlled power operated control means is controlled by movement of a manually operable controller and de-energization thereof is controlled solely by the power operated control means.

Other objects of the invention will be evident by referring to the following detailed description and single schematic drawing illustrating the novel features thereof. While I have chosen to illustrate the present invention in connection with a multiple unit control system for reversing and disconnecting means for electric traction vehicles, it is to be understood that the principles of the invention may be applied to other constructions and that power means other than the type shown, such as electropneumatic means, may be used with equal advantages.

Referring to the drawing, it will be observed that two complete control systems, each comprising identical control apparatus, are shown for the purpose of controlling similar electrical apparatus such as traction motors for two locomotive units, not shown. Each control system for a separate locomotive unit is indicated in the spaces A and B separated by the dash and dot lines, and the following description will be confined to one of these identical systems; the operation of a plurality of such systems when connected in multiple also will be described later on.

A power operated, combined reversing and disconnecting control switch is generally indicated at 1, suitable power operated connection changing control means therefor shown as a relay are indicated at 3, and a manually operable master controller 5 is interconnected with both these control means and to a train line 7 comprising a plurality of control conductors, by which one or a plurality of control systems may be connected in multiple therewith for control from any master controller.

The power operated reversing and disconnecting control switch 1 comprises a member or drum 9 which is movable in either direction from a neutral position in which it is shown by power means shown at 11 and 13. The drum 9 is rotatably supported in a frame 15 provided with suitable bearings 17 in which reduced diameter end portions of the drum are rotatably supported, the upper reduced diameter end portion having a member 19 fixed thereto for movement in either direction by the power means which, as shown, comprises separate electromagnets 11 and 13 adapted, when separately energized, to attract and move the member 19 serving as an armature in either direction. It will be evident that the power means or electromagnets 11 and 13, which are shown fixed on the frame 15, may serve to control any other well known type of power means such as a pressure operated reversible type of servo by means of suitable valves operated by these electromagnets in a well known manner, the servo being operably connected to the drum 9 by any well known means to cause reverse movement thereof. A spring biased detent 21 is pivoted to the frame 15 and serves to retain the drum in the neutral position as one end thereof is shown in a detent groove 23 in the drum and the detent may also enter similar grooves in the drum spaced on either side of the groove 23 adjacent stops 25 and 27 on the drum 9, which limit the movement of the drum in either direction from the neutral position.

Control means movable by the drum 9, such as the electrical contacts 29 and 31, fixed thereto in any convenient manner, serve to control energization and de-energization of the power means 11 and 13. The contacts 29 and 31 are so located on the drum with respect to each other that upon movement of the drum 9 from the neutral position one or the other of the contacts is moved into contact with fixed contact fingers 33, 35 and 37 suitably supported on the frame 15. Contact 29 serves to bridge the fingers 33 and 35, and contact 31 serves to bridge the fingers 33 and 37.

One terminal of each of the electromagnets is grounded at 39, the opposite terminal of electromagnet 11 being connected by a conductor 41 to the contact finger 37, and the opposite terminal of electromagnet 13 being connected by a conductor 43 to the contact finger 35, so that when the drum is moved to the right hand position by electromagnet 13 the electromagnet 11 is connected to finger 33 by contact 31 bridging fingers 37 and 33, and when the drum is moved to the left hand position by electromagnet 11 the electromagnet 13 is connected to finger 33 by the contact 29 bridging fingers 33 and 35. With the above arrangement of connections it will be evident that if the finger 33 is connected to a source of power by means about to be described, movement of the drum 9 in either direction from the neutral position in which it is shown will cause momentary energization of one or the other of the electromagnets through one or the other of the contacts 31 or 29, to cause the drum and contacts to be moved back toward the neutral position, which causes de-energization of either of the electromagnets. The movement of the drum imparted by momentary energization of either of the electromagnets will be stopped by entrance of the spring biased detent 21 into the detent slot 23.

Other fixed contact fingers, not shown, connected to electrical equipment such as the traction motors, not shown, are located adjacent the other contacts shown on the drum which are movable into or out of contact with these fingers to reverse, disconnect or connect the traction motors to a suitable power source, not shown.

The master controller 5 serves to control energization of the power means to cause movement of the drum 9 of the disconnecting switch 1 in either direction in concordance with controller movement in either direction. The controller is constructed similarly to the switch mechanism 1 and comprises a drum 45 rotatably mounted in suitable bearings in a frame 47 having a handle 49 fixed thereto, so that it may be moved manually in either direction from a neutral position in which it is shown to one or the other position at either side of the neutral position. A spring biased detent 51 pivoted on the frame serves to retain the drum in either of these three positions when the end thereof enters slots suitably located in the drum for this purpose. A plurality of contact fingers 57, 59, 73 and 75 are suitably located and supported on the frame 47 so that they may be bridged by means movable by the drum comprising two interconnected contacts 53 and 55 fixed to the drum. When the drum 45 is in the neutral position contact fingers 57 and 59 are bridged by a portion of contact 55, and both are accordingly connected to a source of power such as the battery indicated, having one terminal grounded at 60 and the other terminal connected to the finger 57 by a conductor 61 when a battery switch 63 connected in series between the battery and the conductor 61 is moved to a closed position. A control conductor 65 interconnects the finger 59 to a train line conductor 67, and control conductors 69 and 71 serve to interconnect respectively the fingers 73 and 75 with the train line conductors 77 and 79. The shape of the contact 55 is such that the finger 57 bears thereon for all positions of the controller drum 45. When the drum and contact 55 are moved in either direction from the neutral position a slight amount, the connection between fingers 57 and 59 is opened, and if the drum is moved to the right hand position a different portion of the contact 55 bridges the fingers 73 and 57 which connects the control conductor 69 and train line conductor 77 to the battery. When the drum and contact 55 are moved to the left hand position contact 53, which is shown permanently connected to contact 55, contacts the finger 75, which connects the control conductor 71 and train line conductor 79 to the battery. Suitable connectors 67', 77' and 79' are attached respectively to the train line conductors 67, 77 and 79, by which these train line conductors may be connected in multiple to similar train line conductors provided on other locomotive units when it is desired that other units be controlled in multiple from a master controller 5.

The power operated connection changing control means 3 previously mentioned is shown as a relay or contactor comprising an electromagnetic winding 81, and an armature 83 movable thereby which is provided with three contacts fixed thereto and capable of being moved into or out of bridging relation with three pairs of spaced fixed contacts. With the armature 83 in the position shown the two upper armature contacts are shown bridging the two upper pairs of fixed contacts, and the lower armature contact is positioned below and out of contact with the lower pair of fixed contacts. The upper pair of fixed spaced contacts are connected between the control conductor 71 and conductor 41, which connects the electromagnet 11 to the contact finger 37 of the switch 1. The central pair of fixed spaced contacts of the relay 3 are connected between control conductor 69 and the conductor 43 interconnecting the electromagnet 13 and the contact finger 35, and the lower pair of fixed spaced contacts are connected between control conductor 65 and the contact finger 33. The winding 81 has one terminal grounded at 85 and the other terminal connected to the control conductor 65, and when energized moves the armature 83 upward so that the lower armature contact bridges the lower pair of fixed contacts and the other two armature contacts move out of bridging relation with the two upper pairs of fixed contacts.

The operation of the two identical control systems shown at A and B located on different locomotive units is the same, and operation of one will be described with references made to the other where it is necessary to show the novel features of the control when both systems are connected in parallel, as shown, by means of the connectors 67', 77' and 79', which connect similar train line control conductors 67, 77 and 79 on each of the two systems, as has been previously mentioned. Closure of the battery switch 63 connects the train line conductor 67 to the battery through conductor 61, contact fingers 57 and 59 which are bridged by the contact 55 of the master controller when in the neutral position as shown, and conductor 65 connected between the contact finger 59 and the train line conductor 67. The electromagnetic winding 81 of the connection changing control means or relay 3 is accordingly energized through its connection with the control conductor 65 and attracts and moves the armature 83 upward causing the lower pair of fixed contacts to be bridged by the lower armature contact, and simultaneously moves the upper armature contacts out of bridging relation with the two upper pairs of fixed contacts. When the lower pair of fixed contacts are thus bridged the contact finger 33 of the combined disconnecting and reversing switch 1 is connected to the battery, as is the corresponding finger of the switch shown at B.

Should any switch drum 9 be in a position on either side of the neutral position with the finger 33 thus connected to the battery, one or the other of the electromagnets 11 or 13 will be energized through either of the contacts 29 or 31 on the drum 9 to cause movement of the drum to the neutral position, as has been explained previously.

Movement of the master controller drum 45 to the right hand position from the neutral position causes the contact 55 to move out from under finger 59, which disconnects conductor 65, electromagnetic winding 81 and train line conductor 67 from the battery and causes finger 73 to be connected to finger 57 by another portion of the contact 55 which connects the control conductor 69 and train conductor 77 to the battery. De-energization of the electromagnet 81 of the relay 3 allows the two upper armature contacts to drop by gravity and bridge the two upper pairs of fixed contacts and causes the lower armature contact to move out of bridging relation with the lower pair of fixed contacts. As the middle pair of fixed contacts, which are now bridged, are connected between the control conductor 69 and conductor 43, the electromagnet 13 will be energized and cause movement of the drum 9 of the switch 1 to the right in concordance with the movement of the master controller drum 45 to the right. The control drum of the switch on the B unit likewise will be moved to the right in concordance with the master controller, as the control means therefor will act in like manner when the battery is connected to train line conductor 77 through the connector 77'. When the drums 9 of both reversing switches are moved to the right hand positions the two upper fingers 37 and 33 thereof are bridged by the drum contact 31, which establishes a connection between the electromagnet 11 and the finger 33, which, when subsequently energized through this connection by means about to be described, will cause movement of the drums 9 of both of the control switches 1 to the neutral position. Subsequent de-energization of each of the electromagnets 11 will be controlled independently by movement of each of the contacts 31 out from under the fingers 33 and 37 of each of these switches.

Movement of the master controller drum 45 from the right hand position back to the neutral position causes contact 55 to move out from under finger 73 and again cause the contact 55 to bridge the fingers 57 and 59, which again connects conductor 65, the electromagnetic winding 81 of the relay 3 and train line conductor 67 to the battery. This causes upward movement of the armature 83 of control means 3, which opens the connection between conductors 41 and 71 and also opens the connection between conductors 43 and 69. The electromagnet 11 will, therefore, be energized through the lower fixed contacts of the control means or relay 3 which are bridged by the lower armature contact and thence through the connection previously established comprising the fingers 33 and 37 bridged by the contact 31 of the control switch drum 9. When the electromagnets 11 are energized the drums 9 of both switches 5 will be moved back to the neutral position in concordance with movement of the controller drum 45. It will be evident that de-energization of each of the electromagnets 11 will be accomplished independently by movement of the respective contacts 31 of the switch drums out from under the fingers 37 and 33. The arcuate length of the contacts 31 is such that the length of time that the fingers 37 and 33 are bridged and therefore the duration of energization of the electromagnets is such that the drums will be returned to the neutral position and be stopped in this position by the spring biased detents 21 entering the slots 23 in the drums 9.

Movement of the controller drum 45 to the left of the neutral position disconnects conductors 65, electromagnetic winding 81 and train line connector 67 from the battery in the same manner as described above, and causes contact 53, which is permanently interconnected to contact 55, to move into contact with finger 75, which connects the control conductor 71 and train line conductor 79 to the battery. The bridging of the two upper pairs of fixed contacts by the respective armature controls of the relay 3 upon de-energization of the electromagnetic winding 81 causes energization of the electromagnet 11 through the upper pair of fixed contacts thus bridged, causing movement of the control drum 9 of the switch 1 to the left in concordance with movement of the controller. When the drum 9 and contact 29 are in the left hand position the fingers 33 and 35 are bridged by this contact and a connection is established from electromagnet 13 to the finger 33.

Movement of the controller drum 45 from the left hand position back to the neutral position breaks the connection between fingers 75 and 73, disconnecting control conductor 71, electromagnet 11 and train line conductor 79 from the battery, and causing fingers 57 and 59 to be bridged again by contact 55, which causes energization of the winding 81 of the relay 3; this connects finger 33 of the switch to the battery upon upward movement of the armature of the relay 3, which at the same time opens the connections to conductors 41 and 43 to the electromagnets 11 and 13. The electromagnet 13 is accordingly momentarily energized through the connection established, as mentioned above, comprising finger 33, which is connected to finger 35 by drum contact 29, causing movement of the control drum 9 and contact 29 to the left out from under the fingers 33 and 35 and to neutral position in concordance with the movement of the controller drum 45, and movement of the drum 9 is arrested by the spring biased detent entering the slot 23 in the drum.

The de-energization of the electromagnet 13 is controlled by movement of the contact 29 to the neutral position, which has an arcuate length equal to that of the contact 31. The movement of the switch of the B unit to the neutral position will be accomplished by its control means in a similar manner, the de-energization of each of the electromagnets of the A and B switches being controlled independently by the contacts 29 and 31 on the drums of these switches.

With the above described control system it will be evident that the power operated connection changing control means or relay 3 controlled by the master controller 5 serves to connect the power means operating the disconnecting and reversing switch 1 directly to the controller for control thereby to cause movement of the switch in either direction from the neutral position in concordance with the controller movement from the neutral position and serves to break this direct connection and to then connect the controller in series with the reversing and disconnecting contacts carried by the switch drum 9 when the controller is moved in either direction to the neutral position to cause momentary excitation of the power means for the switch, through the disconnecting contacts so that the switch will be moved in either direction back to the neutral position in concordance with the controller movement. If the control means or relay 3 is not provided, and conductors 41 and 43 and contact finger 33 are connected respectively directly to the control conductors 65, 69 and 71, which are in turn connected respectively to the train line conductors 67, 77 and 79, differences in the power supply to the respective power means for the individual switches, such as differences in voltage or fluid pressure, as the case may be, and/or differences in friction of these switches, may cause overshooting of certain of these switches when a plurality of switches are connected in multiple by the train line conductors, as will now be described.

With the above described direct connections, assume that the master controller drum 45 is in the right hand position and the switch drums 9 of the A and B units are moved to corresponding positions as both electromagnets 13 are then energized. When the controller is moved back to the neutral position each of the electromagnets 11 will be connected to the battery by fingers 35 and 37 bridged by contacts 31, conductors 65, train line conductors 67, and fingers 59 and 57 of the controller to the battery. Assume that the resistance of the switch 1 of the B unit is greater than that of the A unit and/or that the power supplied to the power means or electromagnet 11 of the B unit is less than that supplied to the power means 11 of the A unit, the drum 9 of the switch of the A unit will accordingly be moved to the neutral position before that of the B unit. De-energization of the electromagnet 11 of the A unit will not take place by movement of the contact 31 of the A unit to the neutral position as the contact 31 of the B unit switch will still be in bridging relation with the fingers 33 and 37 of this switch which maintains a parallel connection between both electromagnets by conductors 71 and train line conductors 79, causing movement of the drum 9 of the A unit beyond the neutral position. If the drum 9 of the A unit reaches the left hand position before the contact 31 of the B unit moves out from under fingers 33 and 37, the contact 29 of the A unit will bridge fingers 33 and 35 of the A unit and both electromagnets 11 and 13 of both units will be connected in parallel and simultaneously energized through the conductors mentioned above and conductors 69 and train line conductor 77, and hunting and erratic movement of both drums will occur.

It is, therefore, evident that by providing the connection changing control means or relay 3 in combination with each combined reversing and disconnecting switch 1 interconnected to the train line and controller, as shown, concordance of movement of all of the switches with any given controller is provided constituting a distinct advantage over a control system not provided with this control means.

I claim:

1. In a remote control system comprising a plurality of reversing and disconnecting switch mechanisms, each switch mechanism including power means for operating it, power operated connection changing control means for said power means and a plurality of control connections interconnecting said power means and said power operated connection changing control means, and a master controller manually movable to a plurality of positions interconnected with the control connections of all of said switch mechanisms for simultaneously controlling energization of all of said power means therefor to cause each switch to be moved to any one position in concordance with the movement of the master controller, one of said positions of said controller controlling energization of all of said power operated connection changing control means so that a connection is established between said controller and each of said disconnecting switches so that de-energization of each power means for each switch is controlled by independent movement of that switch.

2. The combination of a plurality of control systems, each system comprising a reversing and disconnecting control switch movable in either direction from and to a neutral position, power means for moving the switch, a master controller for controlling energization of said power means, a plurality of control connections interconnecting said controller with said control switch, power operated connection changing means included in said control connections and parallel connections from each of said control connections adapted to be connected to a plurality of identical control systems so that energization of all of said power means for said switches and of all of said power operated connection changing means is controlled by said controller, and de-energization of each of said power means for each of said switches is independently controlled by a respective switch to insure concordance of movement of all of said switches to and from a neutral position upon movement of any controller from and to a neutral position.

3. In a control system, a pair of remotely positioned switch members, each of said members being movable in either direction from a neutral position, one of said switch members being manually operable, power means for moving said other switch member in either direction, means for restraining movement of said power operated member, disconnecting and reversing means movable by said power operated member for controlling said power means, separate power operated control means for said power means, control connections interconnecting said power means, said separate power operated control means and said disconnecting and reversing means, and a train line including a plurality of control conductors interconnecting said manually operable switch with said separate power operated control means and adapted for connection with any number of similar control means so that energization of said separate power operated control means and said power means is controlled by movement of said manually operable switch, causing said switch moved by said power means to follow movement of said manually operable switch from and to a neutral position, at which latter position the de-energization of said power means by the disconnecting means movable by the switch takes place.

4. In a control system, a disconnecting and reversing switch, power means for moving said switch in either direction to and from a disconnecting position, power connections interconnecting said power means and said switch, a master controller movable to any one of three positions, and power connections interconnecting said master controller with said first named power connections and including a power operated relay for changing said connections so that energization of said power means is controlled by said master controller and de-energization thereof is controlled by said switch.

5. In a control system, a disconnecting and reversing switch, power means for moving said switch in either direction to and from a disconnecting position, means for resisting movement of said switch by said power means, power connections interconnecting said power means and switch, a master controller movable manually to any one of three positions, power connections interconnecting said controller with said first named power connections and including power operated connection changing means so that energization of said power means is controlled by said controller and deenergization thereof is controlled solely by said switch to cause movement thereof in concordance with movement of said controller and parallel power connections interconnecting said controller to train line conductors for controlling a plurality of switches, power means therefor and power operated connection changing means in multiple from the master controller in a manner like that described above.

6. In a control system, a disconnecting and reversing switch movable in either direction to and from positions on either side of a disconnecting position, frictional means for retaining said switch in these positions, separate power means for moving said switch in either direction, a master controller movable manually to and from positions on either side of a neutral position, a plurality of control connections connected to said controller adapted to be separately energized when said controller is in any one of said positions, and power connections connected in parallel with said control connections interconnecting said power means and said switch and including power operated connection changing means so that either of said power means may be directly energized, or energized through said disconnecting switch only to cause movement thereof to the disconnecting position in concordance with movement of said controller to the neutral position.

7. In a multiple unit control system, a plurality of power operated disconnecting and reversing switches each including control means for reversing and disconnecting the respective power operated switches, a train line including a plurality of conductors, a master controller connected to said train line and movable in either direction from and to either of two positions on either side of a neutral position for controlling energization of any one of said conductors, and a plurality of conductors interconnecting each of said power operated disconnecting and reversing switches in parallel relation with individual conductors and including a power operated relay for completing or opening said connections to that energization of all of said power operated switches is controlled by said master controller and de-energization of each power switch is accomplished by the respective control means thereof.

8. In a control system, a disconnecting and reversing switch, electromagnetic means for moving said switch in either direction from a disconnecting position, conductors connecting said electromagnetic means with said switch, friction means for resisting movement of said switch through disconnecting position, a master controller movable in either direction from and to a neutral position, and conductors interconnected with said first named conductors and including an electromagnetically operated relay for changing these connections so that energization of both said electromagnetically actuated means are controlled by said controller and de-energization of said electromagnetic means for said switch is controlled solely by said switch.

9. In a control system, a reversible disconnecting and reversing switch including power operating means for reversing said switch and control connections between said switch and power operating means, and means for controlling reversal and energization of said power means comprising a multi-position controller, energizing connections between said controller, said switch and said power operating means for said switch, said energizing connections including power operated connection changing means controlled by said controller for connecting said controller to said power operating means either directly or through said reversing and disconnecting switch so that said switch controls de-energization of said power operating means.

10. In a control system adapted for operation in multiple with like control systems, said system comprising a reversible disconnecting and reversing switch including power operating means therefor, control connections between said switch and power operating means, a multi-position controller for controlling reversal and energization of said power operating means, energizing connections between said controller and said switch and power operating means therefor, said energizing connections including power operated connection changing means controlled by said controller for connecting said controller either directly to said power operating means or indirectly thereto through said switch so that said controller controls energization of said power operating means directly or indirectly through said switch and said power operating means is disconnected from the controller by said switch, and train line conductors connected in multiple with said energizing connections so that other like control systems may be controlled and operated in multiple from said controller.

11. In a remote control system comprising a switch movable in either direction through a disconnecting position to reversing positions, means for resisting movement of said switch through said disconnecting position, power means for causing reverse movement of said switch, reversing and disconnecting connections interconnecting said switch and power means, a manually operable controller movable through a neutral control position to reversing positions for controlling energization and reversal of said power means directly or through said switch, energizing connections between said controller and said control connections interconnecting said switch and power means, said energizing connections including switching means for connecting said controller with said power means directly and movable to connect said controller to said power means through said switch for disconnection by said switch, and power means energizable by movement of said controller to said neutral position for moving said switching means.

STUART H. COWIN.